(12) United States Patent
Ryu et al.

(10) Patent No.: US 6,271,161 B1
(45) Date of Patent: *Aug. 7, 2001

(54) COMPOSITION FOR BARRIER RIBS OF PLASMA DISPLAY PANEL AND METHOD OF FABRICATING SUCH BARRIER RIBS USING THE COMPOSITION

(75) Inventors: Byung-Gil Ryu, Seoul; Myeong-Soo Chang, Euiwang, both of (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 09/385,438

(22) Filed: Aug. 30, 1999

(30) Foreign Application Priority Data

Sep. 1, 1998 (KR) .................................................. 98-35901

(51) Int. Cl.$^7$ ............................. C03C 3/066; C03C 3/074
(52) U.S. Cl. .................................................. 501/76; 501/79
(58) Field of Search .................................. 501/32, 76, 79

(56) References Cited

U.S. PATENT DOCUMENTS

| | | | | |
|---|---|---|---|---|
| 2,842,458 | * | 7/1958 | Feeney et al. ........................ | 501/76 |
| 2,930,713 | * | 3/1960 | Hoffman ................................ | 501/76 |
| 3,544,508 | * | 12/1970 | Smith .................................... | 501/76 |
| 4,451,761 | * | 5/1984 | Kay ...................................... | 501/76 |
| 5,079,193 | * | 1/1992 | Donohue .............................. | 501/76 |
| 5,204,290 | * | 4/1993 | Mizuno et al. ....................... | 501/76 |
| 5,447,892 | * | 9/1995 | Katsumata et al. .................. | 501/22 |
| 5,674,634 | * | 10/1997 | Wang et al. ......................... | 428/688 |
| 6,010,973 | * | 1/2000 | Watanabe et al. ................... | 501/76 |
| 6,184,163 | * | 2/2001 | Lee et al. ............................. | 501/32 |

FOREIGN PATENT DOCUMENTS

| | | | |
|---|---|---|---|
| 10-112265 | * | 4/1998 | (JP) . |
| 10-208644 | * | 8/1998 | (JP) . |
| 11-021148 | * | 1/1999 | (JP) . |

* cited by examiner

*Primary Examiner*—David R. Sample
(74) *Attorney, Agent, or Firm*—Fleshner & Kim, LLP

(57) ABSTRACT

A composition for barrier ribs of plasma display panels and to a method of fabricating such barrier ribs using the composition is disclosed. The composition for the barrier ribs is $SiO_2$—$ZnO$—$PbO$—$B_2O_3$ based glass. The $SiO_2$—$ZnO$—$PbO$—$B_2O_3$ based glass consists of 10~20 wt % of $SiO_2$, 10~30 wt % of ZnO, 5~30 wt % of PbO, 10~30 wt % of $B_2O_3$, 2~10 wt % of $K_2O$, 0~5 wt % of $Li_2O$, 1~5 wt % of CaO, 3~8 wt % of $Na_2O$, 1~5 wt % of $Al_2O_3$, and 0~2 wt % of $Sb_2O_3$. In the method of forming the barrier ribs, the $SiO_2$—$ZnO$—$PbO$—$B_2O_3$ based glass powder free from an oxide filler is primarily prepared. Paste or slurry is formed by mixing the $SiO_2$—$ZnO$—$PbO$—$B_2O_3$ based glass with an organic vehicle. A thick film, having a predetermined thickness, is formed on the top surface of a lower substrate using the paste or slurry. Desired barrier ribs are, thereafter, formed by processing the paste or slurry film. In the barrier rib formation step, a pattern is formed on the top surface of the paste or slurry film before the paste or slurry film is etched or abraded using the pattern as a mask. The barrier ribs may be formed by stamping the paste or slurry film using a mold having a shape opposed to the desired pattern of the barrier ribs. The barrier ribs may be also formed by patterning a photoresist paste or slurry film.

4 Claims, 4 Drawing Sheets

COMPOSITION FOR BARRIER RIBS OF PLASMA DISPLAY PANEL AND METHOD OF FABRICATING SUCH BARRIER RIBS USING THE COMPOSITION

BACKGROUND OF THE INVENTION

1. Field of the Invention

The present invention relates, in general, to plasma display panels and, more particularly, to a composition for barrier ribs of such plasma display panels and to a method of fabricating such barrier ribs using the composition.

2. Description of the Prior Art

Flat display devices, such as a liquid crystal display (LCD), a field emission display (FED) and a plasma display panel (PDP), have been actively studied in recent, and the technique relative to such display devices has been somewhat actively developed.

FIG. 1 is a sectional view, showing the cell structure of a conventional AC-PDP of the surface discharge type, or the most widely used PDP in recent days. As shown in the drawing, each cell of the conventional AC-PDP comprises upper and lower parallel substrates 1 and 15. The upper substrate 1 is preferably made of a transparent material, such as glass, thus effectively transmitting visible light, while the lower substrate 15 is preferably made of glass or metal. Two sustain electrodes 5, individually consisting of a transparent electrode 3 and a bus electrode 7, are arranged on the lower surface of the upper substrate 1. Such a transparent electrode 3 is preferably made of indium tin oxide (ITO), while such a bus electrode 7 is preferably made of aluminum (Al) or chrome/copper/chrome (Cr/Cu/Cr). A first dielectric film 10, made of PbO, is formed on the lower surface of the upper substrate 1 while covering the sustain electrodes 5. A protection film 12, made of MgO, is formed on the first dielectric film 10 through a vapor deposition process. The objective of the above protection film 12 is to protect the dielectric film 10 from an ion sputtering effect. The above protection film 12 has a high secondary electron generation coefficient when a low ion energy is applied to the surface of the film 12 during a PDP plasma discharging process. The protection film 12 thus effectively reduces the voltage for driving and sustaining the plasma.

An address electrode 17 is positioned on the upper surface of the lower substrate 15, while a second dielectric film 19 is formed on the upper surface of the lower substrate 15 while covering the address electrode 17. Two barrier ribs 21, having a stripe shape, are parallely formed on the upper surface of the second dielectric film 19, with the address electrode 17 being positioned on the lower substrate 15 at a middle position between the two barrier ribs 21. A black matrix 23 is formed on the top end of each of the barrier ribs 21, thus improving the contrast of the PDP. A plurality of phosphor layers 25 are formed on the upper surface of the second dielectric film 19 and are formed on the sidewalls of both the barrier ribs 21 and the black matrixes 23. The above phosphor layers 25 emit R, G and B visible light corresponding to red, green and blue. The phosphor layers 25 are isolated from each other by both the barrier ribs 21 and the black matrixes 23. In the above cell of the PDP, the R, G and B phosphor layers 25 form one pixel. The upper and lower substrates 1 and 15 are, thereafter, integrated into a single structure, thus forming a desired cell of the PDP with discharge spaces being defined by the barrier ribs 21 and being filled with mixed gas, such as Ne+Xe gas.

The above AC-PDP is operated as follows. That is, a constant voltage is applied to the gap between the address electrode and one of the two sustain electrodes, and so the address electrode discharges to select desired display cells. In the case of such an addressing discharge, a wall voltage is generated in each of the selected cells. After the addressing discharge, an AC voltage is applied to the two sustain electrodes at the same time, and so the selected cells perform a sustain discharge to emit visible light. Such a sustain discharge is controlled to change the brightness level in accordance with discharge time.

In the above PDP cell structure, the objective of the barrier ribs 21 is to secure a space for gas discharge between the upper substrate 1 and the lower substrate 15. The formation of the above ribs 21 is also to isolate the phosphor layers 25 from each other, thus partitioning the discharge cells, and to determine the distance between the electrodes for performing discharge, and to prevent crosstalk due to discharge from neighboring cells, and to reflect light from the phosphor layers 25 to the upper substrate 1. In order to accomplish the above-mentioned objective of the barrier ribs 21, the ribs 21 necessarily have a low thermal expansion coefficient, a high thermal stability, a low baking temperature, a dense structure and a low dielectric constant.

In the prior art, such barrier ribs are typically made of $PbO\text{---}B_2O_3\text{---}SiO_2$ based glass or $PbO\text{---}B_2O_3\text{---}SiO_2$ based glass, including a large amount of 60~80 wt % of PbO. The composition of the above $PbO\text{---}B_2O_3\text{---}SiO_2$ based glass is given in Table 1.

TABLE 1

| Components(wt %) | PbO | $B_2O_3$ | $SiO_2$ |
|---|---|---|---|
| Contents(wt %) | 60 ~ 80 wt % | 5 ~ 15 wt % | 15 ~ 20 wt % |

Such a conventional barrier rib for PDPs is fabricated as follows. As shown in the processing diagram of FIG. 2, a glass-ceramic material, prepared by mixing an oxide filler with $PbO\text{---}B_2O_3\text{---}SiO_2$ based glass or $PbO\text{---}B_2O_3\text{---}SiO_2$ based glass at a predetermined ratio, for example, 4:6~7:3, for a predetermined time, is ground at step 31, thus forming a fine mixture powder having a size not larger than 10 μm. In the above step, an $Al_2O_3$ and $TiO_3$ mixture is used as the oxide filler and the composition of $Al_2O_3$ and $TiO_3$ mixture is given in Table 2.

TABLE 2

| Components (wt %) | $Al_2O_3$ | $TiO_3$ |
|---|---|---|
| Contents(wt %) | 95 ~ 100 wt % | 0 ~ 5 wt % |

Thereafter, the mixture powder from the step 31 is mixed with an organic vehicle, thus forming a paste or a slurry at step 32. In such a case, the organic vehicle is formed by mixing BCA (butyl-carbitol-acetate), BC (butyl-carbitol) and EC (ethyl-cellulose) together at a predetermined mixing ratio. After the step 32, the paste or the slurry is applied to the top surface of the second dielectric film 19 of the lower substrate 15, thus forming a paste or slurry film having a thickness prior to forming the barrier ribs 21 at step 33. In such a case, the formation of the barrier ribs 21 is performed through a screen print process, a sand blast process, an etching process, an additive process or a stamping process. The above processes for the formation of the barrier ribs 21 will be described later herein in more detail. Thereafter, the lower substrate 15, having the barrier ribs 21, is primarily baked at a temperature of 300~350° C. for a predetermined time, for example, 15~23 minutes, thus removing the organic vehicle from the paste or slurry. The lower substrate 15 is, thereafter, secondarily baked at a temperature of 600~650° C., thereby finally forming the barrier ribs 21.

The processes of the formation of such barrier ribs 21 will be described in detail hereinbelow with reference to FIGS. 3a to 3d.

FIG. 3a shows a screen printing process of the formation of such barrier ribs 21. As shown in the drawing, a screen (not shown) is primarily and precisely positioned on a lower substrate 40 coated with a thick dielectric film 41 on its top surface. A paste or slurry is applied on the top surface of the dielectric film 41 through the screen prior to being dried, thus forming a plurality of primary barrier rib layers 43 on the film 41 at step "a". The above-mentioned process is repeated several times, thus forming a plurality of secondary, third and more barrier rib layers on the previously formed layers at steps "b" and "c". A plurality of desired barrier ribs are thus formed on the lower substrate 40.

FIG. 3b shows a sand blast process of the formation of such barrier ribs 21. As shown in the drawing, a paste or slurry is applied on the top surface of a thick dielectric film 41, formed on the top surface of a lower substrate 40, thus forming a paste or slurry film 42 having a predetermined thickness, for example, 150~200 µm, at step "a". A laminate film 45 is formed on the top surface of the paste or slurry film 42 at step "b". A laminate pattern 49 is, thereafter, formed on the paste or slurry film 42 through a lithography process using a mask 47 at steps "c" and "d". In such a case, the laminate film 45 is made of a tape-shaped material formed by addition of an organic or inorganic material to a photoresist material or a slurry at a given ratio. An abrasive material under pressure, such as sand, is blasted onto the top surface of the paste or slurry film 42 in a direction perpendicular to the laminate pattern 49, thus removing the paste or slurry from the film 42 at positions exposed to the atmosphere outside the pattern 49 at step "e". Thereafter, the laminate material is removed from the remaining paste or slurry, thus forming a plurality of desired barrier ribs 43 on the lower substrate 40 at step "f".

The steps of a conventional etching process of the formation of such barrier ribs 21 remain the same as that of the sand blast process, but the step "e" of removing the paste or slurry from the film 42 is performed by etching the film 42 using HCl, having a concentration of 5~10%, in place of the sand blasting step.

In the etching process or the sand blast process of forming such barrier ribs, it may be possible to form desired barrier ribs on the lower substrate by patterning the paste or slurry without using any separate photoresist laminate pattern when the paste or slurry film has photosensitivity itself.

FIG. 3c shows an additive process of the formation of such barrier ribs 21. As shown in the drawing, a laminate is applied on the top surface of a thick dielectric film 41, formed on the top surface of a lower substrate 40, thus forming a laminate film 50 having a predetermined thickness, for example, 150~200 µm, at step "a". A laminate pattern 51 is, thereafter, formed on the lower substrate 40 through a lithography process using a mask 47 at step "b" and "c". In such a case, the laminate pattern 51 is opposed to a desired pattern of the barrier ribs 43. Thereafter, a paste or slurry 53 is applied to the top surface of the lower substrate 40 having the laminate pattern 51 on said top surface. The paste or slurry 53 on the lower substrate 40 is abraded until the top surface of the laminate pattern 51 is exposed to the atmosphere at step "d". At that step "d", the paste or slurry 53 is filled in the spaces between the laminate pattern 51. Thereafter, the paste or slurry 53 is dried. The laminate pattern 51 is, thereafter, removed from the top surface of the lower substrate 40, thus forming desired barrier ribs 43 on the lower substrate 40 at step "e".

FIG. 3d shows a stamping process of the formation of such barrier ribs 21. As shown in the drawing, a paste or slurry is applied to the top surface of a thick dielectric film 41, formed on the top surface of a lower substrate 40, thus forming a paste or slurry film 42 having a predetermined thickness, for example, 150~200 µm, at step "a". Thereafter, a mold 55 is placed on the paste or slurry film 42, and a stamping step is performed at step "b". When the lower substrate 40 is made of glass, the stamping step is performed at a predetermined baking temperature. On the other hand, when the lower substrate 40 is made of metal, the stamping step is performed at room temperature. Thereafter, the mold 55 is removed from the lower substrate 40 at step "c", thus forming desired barrier ribs 43 on the substrate 40.

The characteristics of a conventional barrier rib fabricated through one of the above-mentioned processes are given in Table 3.

TABLE 3

| Baking Temp. (° C.) | Dielectric constant (1 MHZ) | Thermal expansion coefficient | Optical absorption rate (400 ~ 800 nm) | Etching rate (µm/min.) |
|---|---|---|---|---|
| 600 ~ 650 | 12 ~ 15 | $80 ~ 85 \times 10^{-7}/°$ | 5 ~ 10% | 4.0 (5% HCl) |

As shown in the Table 3, the dielectric constant of such a conventional barrier rib has a range of 12~15, which is a high dielectric constant. Due to such a high dielectric constant, the barrier rib is problematic in that the addressing signal of the address electrode is retarded. Since PbO, or the basic component of the conventional barrier rib, has a high specific weight, the resulting PDP is undesirably heavy. In addition, the PbO may undesirably cause environmental pollution. It is also necessary for the conventional barrier rib to be baked at a high temperature of not less than 600° C. and the conventional barrier rib has a thermal expansion coefficient of $80~85 \times 10^{-7}/°$ C. Therefore, when such a barrier rib is formed on a conventional glass substrate, the substrate may be undesirably deformed or cracked during a baking process. In the conventional process of fabricating such a barrier rib on a lower substrate, the thick film, made of paste or slurry, is reduced in its structural compactness due to an oxide filler, such as $Al_2O_3$ and $TiO_2$ mixture, added to the glass-ceramic material during a mixing process of preparing fine mixture powder. On the other hand, the conventional etching process of fabrication of the barrier ribs fails to form an evenly etched surface. The optical absorption rate of a conventional barrier rib is 5~10%, which does not reach a desirable rate, and so it is necessary to form a black matrix on the top surface of each barrier rib so as to improve the contrast of a resulting PDP. This complicates the structure of the PDP and results in a complicated process of fabricating such barrier ribs for PDPs.

SUMMARY OF THE INVENTION

Accordingly, the present invention has been made keeping in mind the above problems occurring in the prior art, and an object of the present invention is to provide a composition for barrier ribs of PDPs and a method of fabricating such barrier ribs using the composition, which reduces the dielectric constant of the barrier ribs, thus preventing a retardation of the addressing signal of an address electrode, which reduces the weight of the barrier ribs, thus accomplishing the recent trend of lightness of PDPs, which uses an environment-affinitive material and reduces the baking temperature during a process of making the barrier ribs on a lower substrate, and reduces the thermal expansion coefficient of the resulting barrier ribs, thus accomplishing a desired thermal stability of both the barrier ribs and the lower substrate, which increases the structural compactness of the thick film of paste or slurry, thus accomplishing an evenly etched surface, which increases the optical absorption rate, thus eliminating the step of forming a black matrix to improve the contrast of the resulting PDPs and simplifying both the structure of the PDPs and the process of fabricating the barrier ribs.

In order to accomplish the above object, the present invention provides a composition for barrier ribs of a plasma display panel, comprising $SiO_2$—ZnO—PbO—$B_2O_3$ based glass. The invention also provides a method of forming the barrier ribs of such a plasma display panel, comprising the steps of: forming $SiO_2$—ZnO—PbO—$B_2O_3$ based glass powder free from an oxide filler; forming paste or slurry by mixing the $SiO_2$—ZnO—PbO—$B_2O_3$ based glass with an organic vehicle; forming a thick film having a predetermined thickness on the top surface of a lower substrate using the paste or slurry; and forming barrier ribs by processing the paste or slurry film.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
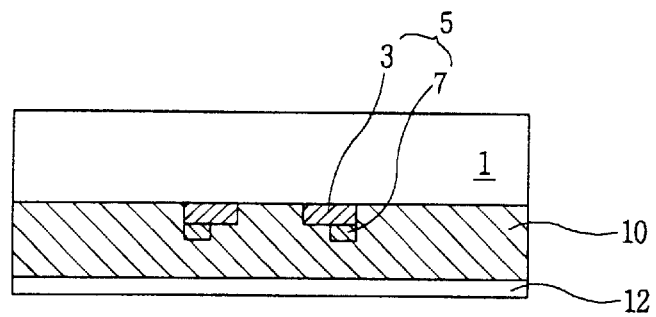
FIG. 1 is a sectional view, showing the cell structure of a conventional PDP.
Figure 1:
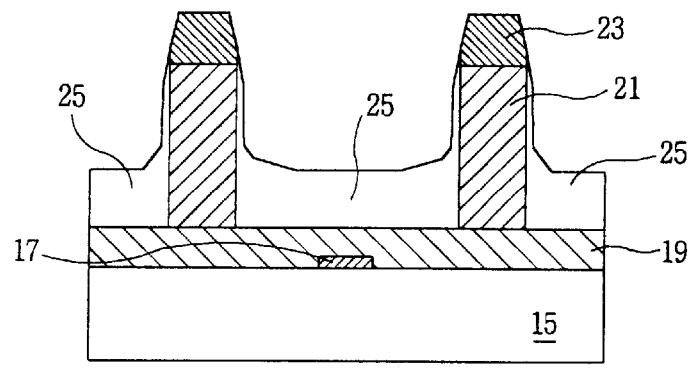
Figure 2:
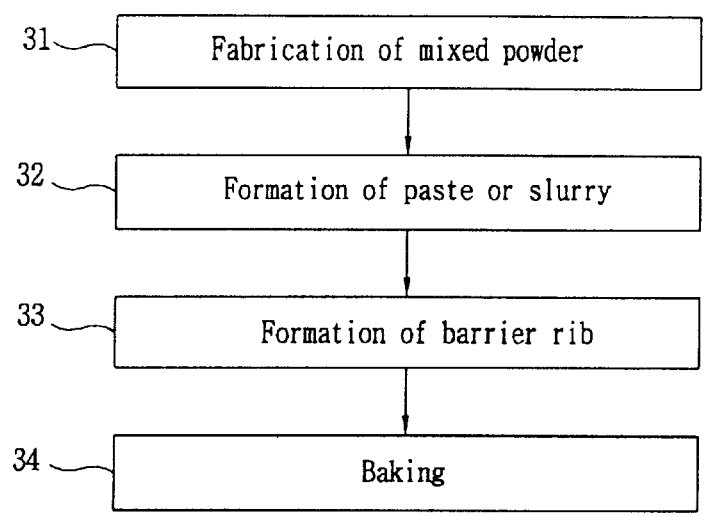
FIG. 2 is a flowchart of a conventional process of fabricating the barrier ribs for PDPs.
Figure 3A:
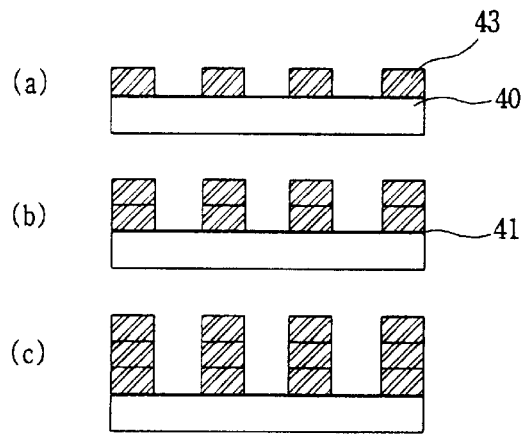
FIGS. 3a to 3d are views, showing a variety of conventional processes of fabricating the barrier ribs for PDPs.
Figure 3B:
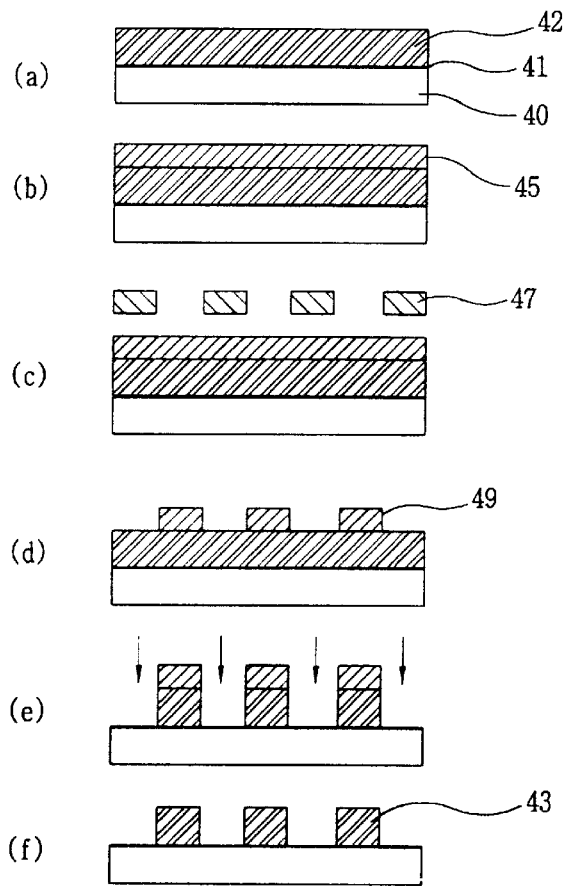
Figure 3C:
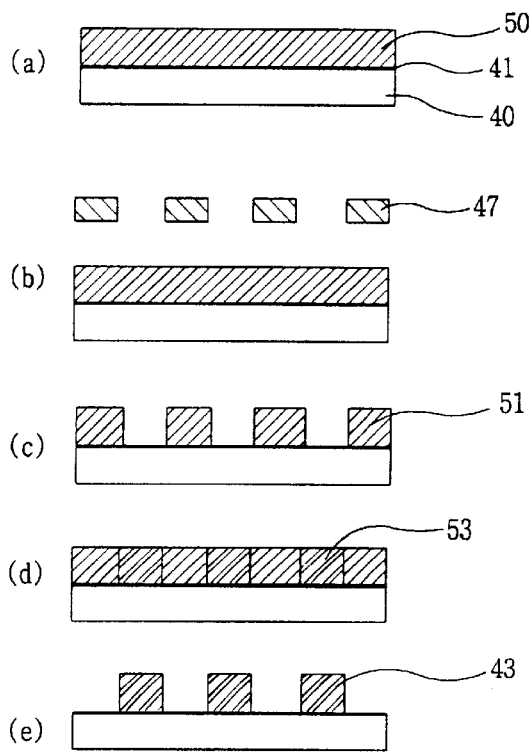
Figure 3D:
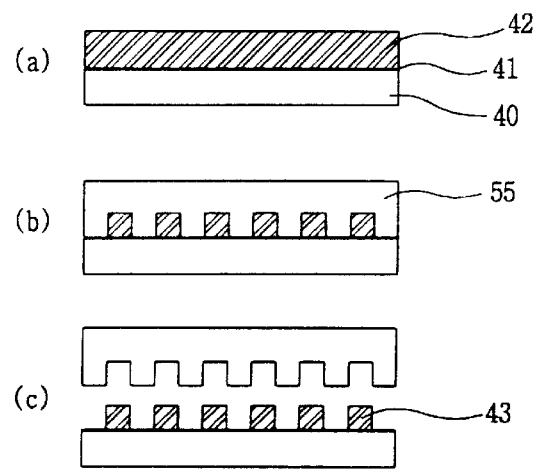

The present invention will be described hereinbelow with reference to FIGS. 4 and 5.

In the preferred embodiment of this invention, the composition for barrier ribs comprises $SiO_2$—ZnO—PbO—$B_2O_3$ based glass. Preferably, the $SiO_2$—ZnO—PbO—$B_2O_3$ based glass has an amorphous structure. The composition of the above $SiO_2$—ZnO—PbO—$B_2O_3$ based glass is shown in Table 4.

TABLE 4

| Composition | contents(wt %) |
| --- | --- |
| $SiO_2$ | 10~30 wt % |
| ZnO | 10~30 wt % |
| $B_2O_3$ | 10~30 wt % |
| PbO | 5~30 wt % |

TABLE 4-continued

| Composition | contents(wt %) |
| --- | --- |
| $K_2O$ | 2~10 wt % |
| $Li_2O$ | 0~5 wt % |
| $Na_2O$ | 3~8 wt % |
| CaO | 1~5 wt % |
| $Al_2O_3$ | 1~5 wt % |
| $Sb_2O_3$ | 0~2 wt % |

In the preferred embodiment of this invention, the composition of the above $SiO_2$—ZnO—PbO—$B_2O_3$ based glass is formulated as indicated in Table 4.

In a detailed description, the content of PbO is not higher than 50 w %, preferably having a range of 5~30 wt %. In the $SiO_2$—ZnO—PbO—$B_2O_3$ based glass for the barrier ribs, it is preferable to set the sum of the contents of $SiO_2$, ZnO, PbO and $B_2O_3$ to not higher than 85 wt % and the sum of the contents of $Li_2O$, $K_2O$ and $Na_2O$ to not higher than 25 wt %. In addition, the weight ratio of the content of PbO to the sum of the contents of $SiO_2$, ZnO and $B_2O_3$ is preferably set to ⅖–⅘. In the present invention, the composition of the $SiO_2$—ZnO—PbO—$B_2O_3$ based glass for the barrier ribs may be used as the material of the black matrix or the material of the dielectric films formed on the top surface of the lower substrate 1.

In the preferred embodiment of this invention, the $SiO_2$—ZnO—PbO—$B_2O_3$ based glass powder is prepared as follows.

The raw material powders of the composition of the $SiO_2$—ZnO—PbO—$B_2O_3$ based glass are primarily and precisely weighed so as to accomplish the predetermined contents (wt%) as indicated in the Table 4. After the weighing process, the raw material powders are mixed together for a predetermined time, for example, 10 hours, using a tumbling mixer, thus forming a glass powder mixture. The glass powder mixture is, thereafter, melted within an electric platinum melting pot at a temperature of about 1000~1200° C. for a predetermined time, for example, 1~5 hours. During the melting process, the melted glass mixture is stirred up two or three times so as to become uniformed in its structure and to have a dense structure. The melted glass mixture from the melting process passes through a quenching roller so as to be quenched, thus becoming cullets having fine cracks. The cullets are milled through a ball milling process prior to being orderly sieved using a #170 sieve and a #270 sieve. Therefore, desired $SiO_2$—ZnO—PbO—$B_2O_3$ based glass powder, having a standard particle size of not larger than 10 μm and a desired particle size distribution, is prepared. The conditions of the ball milling process of milling the cullets are given in Table 5. In the preferred embodiment of this invention, the oxide filler, such as $Al_2O_3$ and $TiO_3$ mixture, is not added to the glass powder differently from the conventional process.

TABLE 5

| Filling amount of mill jar | Number of balls (cylinder type) | Milling speed | lubricant | Milling time |
| --- | --- | --- | --- | --- |
| 250 g | 44/jar | 70 rpm | IPA solution(2 ml) | 16 hr. |

In the preferred embodiment of this invention, the formation process of the paste or slurry using the $SiO_2$—ZnO—PbO—$B_2O_3$ based glass powder is performed as follows.

The $SiO_2$—$ZnO$—$PbO$—$B_2O_3$ based glass powder from the above-mentioned glass powder preparation process is dried within a dry oven at about 150° C. for two or more hours prior to being mixed with an organic vehicle, consisting of a predetermined amount of organic binder and a predetermined amount of organic solvent, thus forming a paste or slurry. In such a case, the mixing ratio of the glass powder to the organic vehicle is preferably set to a range of 5:5~8:2, more preferably 7:3. Of course, the mixing ratio of the glass powder to the organic vehicle may be changed in accordance with a desired state of the resulting paste or slurry. In the preferred embodiment, an organic vehicle, prepared by mixing BCA (butyl-carbitol-acetate), BC (butyl-carbitol) and EC (ethyl-cellulose) together at a predetermined mixing ratio, is used. The viscosity of the resulting paste is changed in accordance with the content of EC of the above organic vehicle, thus finally affecting the rheology and the baking characteristics. Therefore, it is most preferable to set the mixing ratio of EC, BCA and BC to 10%, 60% and 20%. In such a case, the viscosity of the resulting paste is preferably set to about 70,000~100,000 CPS, while the viscosity of the resulting slurry is preferably set to about 700~1,000 CPS. The resulting paste may be preferably used in a screen printing process, while the resulting slurry may be preferably used in a tape casting process. When an appropriate amount of photoresist resin is mixed with the organic vehicle, it is possible to form photosensitive paste or photosensitive slurry, which simplifies the process of the formation of barrier ribs for PDPs.

Figure 4:
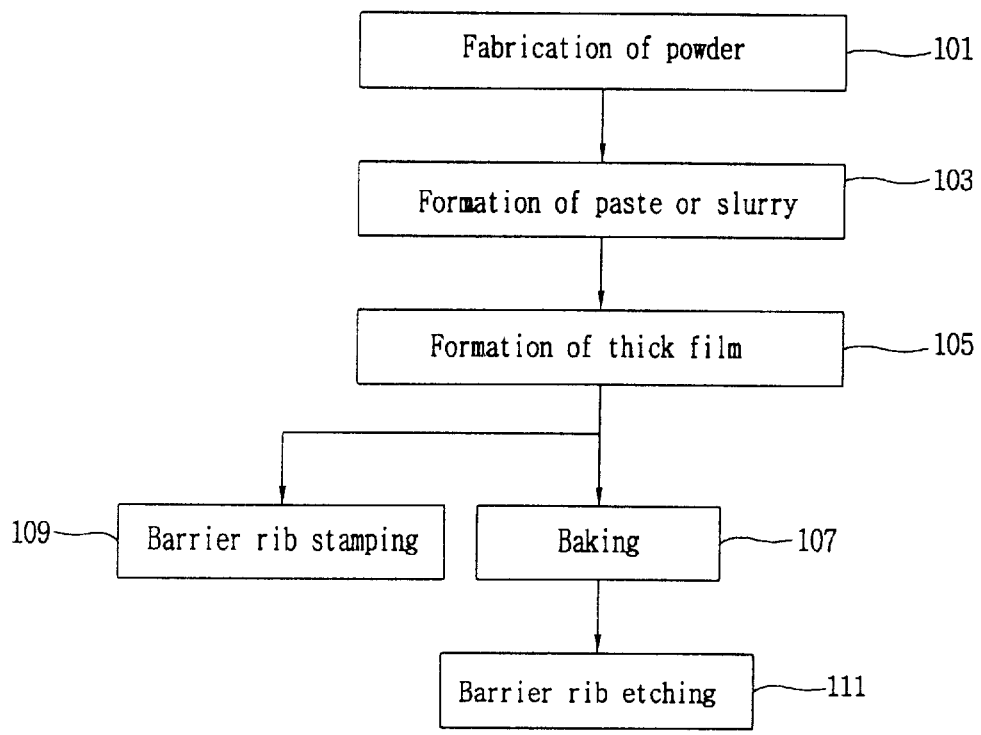
FIG. 4 is a flowchart of a process of fabricating the barrier ribs for PDPs in accordance with the preferred embodiment of the present invention.

FIG. 4 is a flowchart of a process of fabricating the barrier ribs for PDPs using the $SiO_2$—$ZnO$—$PbO$—$B_2O_3$ based glass powder in accordance with the preferred embodiment of this invention.

In the first modification of the preferred embodiment, desired $SiO_2$—$ZnO$—$PbO$—$B_2O_3$ based glass powder is primarily prepared at step 101 in the same manner as that described above. Thereafter, desired paste or slurry is formed using the $SiO_2$—$ZnO$—$PbO$—$B_2O_3$ based glass powder at step 103 in the same manner as that described above. The paste or slurry from the step 103 is applied to the top surface of a thick dielectric film, formed on the top surface of a lower substrate, thus forming a thick paste or slurry film having a predetermined thickness at step 105. The lower substrate having the thick paste or slurry film is baked at a temperature of 550~650° C. at step 107. The baking temperature of this invention is lower than the baking temperature (600~650° C.) of the conventional process. Thereafter, a photoresist pattern is formed on the top surface of the thick paste or slurry film using a laminate film or a photoresist film. The paste or slurry is partially removed from the paste or slurry film at positions, wherein the paste or slurry film is exposed through the photoresist pattern, by a mask etching process or a sand blast process, thus forming desired barrier ribs on the lower substrate at step 111. In the preferred embodiment of this invention, an etching process using 5~10% HCl is used for the formation of the barrier ribs on the lower substrate. An additional baking step may be performed after the step of the formation of the barrier ribs.

In the above-mentioned first modification of the preferred embodiment, it may be possible to form desired barrier ribs on the lower substrate by patterning the thick paste or slurry film through a lithography process without using any separate photoresist laminate film or any separate photoresist film when the thick paste or slurry film has photosensitivity itself.

In the second modification of the preferred embodiment, the step 101 of preparing desired $SiO_2$—$ZnO$—$PbO$—$B_2O_3$ based glass powder, the step 103 of forming desired paste or slurry using the $SiO_2$—$ZnO$—$PbO$—$B_2O_3$ based glass powder, and the step 105 of forming a thick film on the top surface of a lower substrate using the paste or slurry from the step 103 are repeated in the same manner as that described for the first modification. Thereafter, a mold, having a shape opposed to the pattern of the desired barrier ribs, is placed on the paste or slurry film before a barrier rib stamping step is performed at step 109. In this modification, a baking step may be performed after the stamping step. When the lower substrate is made of glass, it is preferable to perform the baking step and the stamping step at the same time. On the other hand, when the lower substrate is made of metal, such as Ti alloy, Cu alloy or Ni alloy, it is preferable to perform the baking step after the stamping step. In addition, an additional baking step may be performed after the step of the formation of the barrier ribs. In such a case, the baking step is preferably performed at a temperature of 550~650° C.

Figure 5:
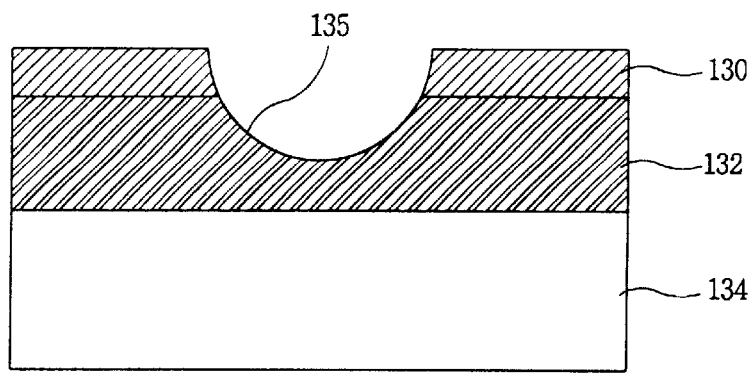
FIG. 5 is a sectional view, showing the structure of a barrier rib for PDPs formed through an etching process of this invention.

FIG. 5 is a sectional view, showing the structure of a barrier rib for PDPs formed through the etching process of this invention. As shown in the drawing, a thick paste or slurry film 132, formed on the top surface of a lower substrate 134 with a laminate pattern or a photoresist pattern being formed on the top surface of the film 132, is processed through an etching process. Therefore, the paste or slurry film 132 is partially etched at a position free from the photoresist pattern, thus forming an evenly etched surface 135 having a semicircular cross-section. Such an evenly etched surface 135 is formed due to the fact that the thick paste or slurry film 132 has a compact structure since the $SiO_2$—$ZnO$—$PbO$—$B_2O_3$ based glass powder is free from any oxide filler.

The characteristics of the barrier rib fabricated through the etching process of this invention are given in Table 6.

TABLE 6

| Baking Temp. (° C.) | Dielectric constant (1 MHz) | Thermal expansion coefficient | Optical absorption rate (400 ~ 800 nm) | Etching rate (μm/min.) |
|---|---|---|---|---|
| 550 ~ 650 | 6 ~ 9 | 75 ~ 85 × $10^{-7}$/° C. | 85 ~ 90% | 4.0 ~ 6.5 (5% HCl) |

As indicated in Table 6, the characteristics of the barrier rib for PDPs of this invention are improved as follows in comparison with that of the conventional barrier rib indicated in Table 3.

That is, since both the baking temperature during the process of the formation of the barrier rib of this invention and the thermal expansion coefficient of the final barrier rib are lower than that in the case of the conventional barrier rib, the lower substrate of the PDP of this invention is not undesirably deformed or cracked during the baking process. The optical absorption rate of the barrier rib of this invention is remarkably increased in comparison with the conventional barrier rib, and so it is not necessary to separately form any black matrix in an effort to improve the PDP contrast. As the dielectric constant of the barrier rib of this invention is reduced in comparison with the conventional barrier rib, it is possible to prevent any retardation of the addressing signal of the address electrode.

As described above, the present invention provides a composition for barrier ribs of plasma display panels and to a method of fabricating such barrier ribs using the composition.

In the present invention, the content of PbO of the composition is remarkably reduced, thus preferably reducing the possibility of environmental pollution caused by PbO. The reduction in the content of PbO also lightens the lower substrate of a resulting PDP, thus accomplishing the recent trend of lightness of the PDPs.

As the dielectric constant of the barrier rib of this invention is reduced, it is possible to prevent any retardation of the addressing signal of the address electrode. In addition, the optical absorption rate of the barrier rib of this invention is remarkably increased, and so it is not necessary to separately form any black matrix in an effort to improve the PDP contrast. This finally simplifies the structure of PDPS and simplifies the process of producing PDPs.

On the other hand, since the $SiO_2$—ZnO—PbO—$B_2O_3$ based glass powder for the barrier ribs of this invention is free from any oxide filler, the thick paste or slurry film formed on the lower substrate has a compact structure. This finally forms an evenly etched surface on the paste or slurry film during an etching process. In the etching process of this invention, the etching rate for the barrier ribs is increased, thus preferably reducing the processing time. In addition, since both the baking temperature during the process of the formation of the barrier rib of this invention and the thermal expansion coefficient of the final barrier rib are preferably low, the lower substrate of the PDP of this invention is not undesirably deformed or cracked during the baking process. This finally improves thermal stability of both the barrier ribs and the lower substrate of the PDP.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A composition for barrier ribs of a plasma display panel, comprising a $SiO_2$—ZnO—PbO—$B_2O_3$ based glass wherein said $SiO_2$—ZnO—PbO—$B_2O_3$ based glass comprises 10–20 wt % of $SiO_2$, 10–30 wt % of ZnO, 5–30 wt % PbO, 10–30 wt % of $B_2O_3$, 2–10 wt % of $K_2O$, 0–5 wt % of $Li_2O$, 1–5 wt % CaO, 3–8 wt % of $Na_2O$, 1–5 wt % of $Al_2O_3$, and $Sb_2O_3$ in an amount not greater than 2 wt %.

2. The composition according to claim 1, wherein the sum of the contents of $SiO_2$, ZnO, PbO, and $B_2O_3$ of said $SiO_2$—ZnO—PbO—$B_2O_3$ based glass is not higher than 85 wt %.

3. The composition according to claim 1, wherein the weight ratio of the content of PbO of said $SiO_2$—ZnO—PbO—$B_2O_3$ based glass to the sum of the contents of $SiO_2$, ZnO and $B_2O_3$ is $2/5$–$4/5$.

4. The composition according to claim 1, wherein said $SiO_2$—ZnO—PbO—$B_2O_3$ based glass is used as a dielectric film or a black matrix in a plasma display panel.

* * * * *